Jan. 26, 1965   P. C. SHERBURNE   3,167,286
PIPE HANGER
Filed Aug. 1, 1963

INVENTOR.
PHILIP C. SHERBURNE
BY Herman Foster
ATTORNEY

United States Patent Office 3,167,286
Patented Jan. 26, 1965

3,167,286
PIPE HANGER
Philip C. Sherburne, East Providence, R.I., assignor to Grinnell Corporation, Providence, R.I., a corporation of Delaware
Filed Aug. 1, 1963, Ser. No. 299,339
2 Claims. (Cl. 248—62)

This invention relates to pipe hangers, and more particularly, to strap hangers for suspending pipe or conduit lines from overhead structures.

In U.S. Patent No. 2,616,645, to H. L. Kindorf et al., there is disclosed a strap hanger to which there is attributed the objects of invention of providing a pipe hanger of extremely simple and inexpensive design which is adjustable throughout a relatively wide range as to the elevation at which it supports pipe; and which is provided with securing means that will not be loosened or dislodged by vibration.

In addition to the above listed objects an object of the present invention is to provide a hanger which is simple and easy to install and which does not require extensive manipulation to place it in a pipe supporting relationship.

Various other objects and advantages will appear from the following description of an embodiment of the invention, and the novel features will be particularly pointed out hereinafter in connection with the appended claims.

Figures 1, 2, 3:
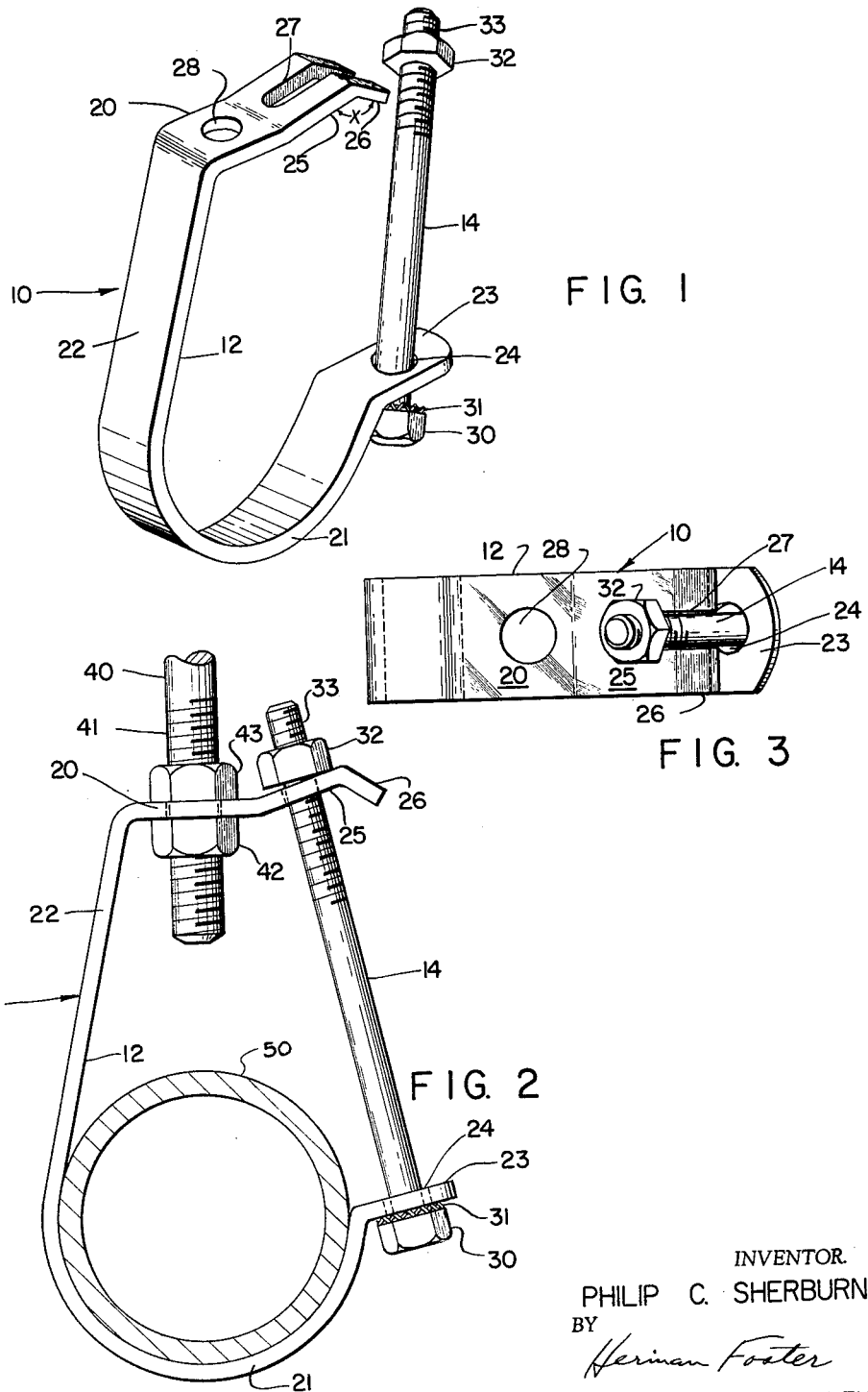
FIGURE 1 is a perspective view of the combination of the strap portion of a hanger and a bolt closure member embodying the present invention.
FIGURE 2 is a front elevation of the entire hanger in a pipe retaining relationship including a portion of a hanger rod to which the hanger is fastened.
FIGURE 3 is a top plan view of the combination of hanger strap and closure bolt in closed position with the pipe and hanger rod removed.

Referring in greater particularity to the drawings, the entire combination is indicated by the numeral 10, which is made up of two main structures, a bent metal strap 12 and a closure bolt 14. The strap is shaped so as to contain a flat straight top portion 20, a curved bottom portion 21 and a straight connecting member 22 between the portions 20 and 21. At the upwardly extending end of the round bottom portion opposite the connecting member 22 is an outwardly bent flat lug 23 containing a hole 24 therethrough. Connected to the top portion 20 are two bent portions 25 and 26. The joining bend between portion 25 and top portion 20 occurs intermediate the end of slot 27 and a perforation 28 though top portion 20. The bent portion 25 is what I prefer to term as "over bent" in that the angle between the portion 25 and lug 23 is an acute angle of approximately 2° to 10° which converges toward the connecting portion 22. The bent portion 26 which is joined to portion 25 is bent sharply toward the lug 23 and forms an angle X with portion 25 which is satisfactory when the angle X falls substantially within the range of 120° to 135°. The bolt 14 has a head 30 preferably located at the bottom surface of lug 23. Interposed between the head 30 and lug 23 is a lock washer 31. At the other end of the bolt is a nut 32 threaded on the threaded portion 33 of the bolt.

When in operative position, the hanger construction is supported from a hanger rod 40 which has a relatively long threaded end portion 41 on which supporting and locking nuts 42 and 43 are threaded to retain the hanger combination in proper position.

Normally, the hanger may be packaged as a single unit with the closure bolt 14 inserted through hole 24 of the lug 23. Upon arrival at the job site the bolt may be extended through hole 24 at an angle as shown in FIG. 1 to properly determine the distance at which nut 32 should be threaded along the bolt threaded portion 33 so as to strike the inclined face of bent portion 26 at a point approximately in the center of the face. Once this determination has been made the bolt is then permitted to slip through hole 24 so that the nut 32 supports the bolt. The strap may then be mounted on the rod 40 at a desired location by means of nuts 42 and 43 and the pipe 50 then inserted to rest on the curved bottom portion 21. The bolt 14 then can be drawn up through the hole 24 so that the nut 32 engages the sloping face of the bent portion 26. The bolt is then forced completely into slot 27 with a sharp blow so that the nut 32 finally engages the upper face of the bent portion 25. In this position the bent portion 25 will be slightly flexed downwardly by the nut 32 thereby acting as a spring washer against the nut and so preventing rotation of the nut 32 which might cause loosening of the bolt. Likewise, the lock washer 31 will prevent rotation of the head 30 on bolt 14. In this position the two members 12 and 14 are locked into place with the weight of the pipe 50 aiding the locked relationship because of the tendency to cause more flexure to be imposed in the bent portion 25. It is obvious from the above description that the hole 24 should be sufficiently large to permit angular rotation of the bolt 14. Also the head 30 should be sufficiently spaced from the upwardly extending end of the bottom portion 21 to permit this angular rotation and if occasionally necessary the axial rotation of head 30 by a wrench or similar tools.

It will be seen that by this arrangement the time required to be on tall ladders or scaffolds for turning nuts on hanger bolts such as 14 can be greatly diminished since the locking relationship of the present device can be established on the ground and the locking action imposed in its operating position by a forceful blow or push. This makes for quicker and safer installation procedures for the pipe supports.

I claim:

1. A pipe hanger comprising a single resilient strap-like member shaped to provide a relatively flat top portion with a hole therethrough for the reception of a supporting hanger rod, a side portion depending from one end of the top portion, a curved bottom portion to support a pipe, said bottom portion having an upwardly extending end, a lug extending outwardly from said upwardly extending end and forming an angle therewith, said lug having a perforation therethrough spaced from said end, a first bent portion joined to the end of the flat top portion, said first bent portion extending outwardly away from said flat top portion and said lug, whereby the first bent portion and said lug form a small acute angle between them extending toward said side portion, a second bent portion joined to said first bent portion and extending toward said lug to form an angle between said first and sceond bent portions within a range extending substantially between 120° and 135°, a slot extending from the outermost end of said second bent portion and having a terminating end at a point intermediate the ends of said first bent portion, a bolt extending through said perforation and said slot adjacent said terminating end, lug engaging means proximate one end of said bolt and spaced from said upwardly extending end to permit rotation of said lug engaging means, means on said bolt spaced from said lug engaging means for engaging the top of said first bent portion and for imposing flexure therein, said last-mentioned means being slidable along the top of said second bent portion during positioning into engagement with the top of said first bent portion.

2. A pipe hanger comprising a single resilient strap-like member shaped to provide a relatively flat top portion with a hole therethrough for the reception of a supporting hanger rod, a side portion depending from one end of the top portion, a curved bottom portion to support a pipe, said bottom portion having an upwardly extending end, a lug extending outwardly from said upwardly extending end and forming an angle therewith, said lug having a perforation therethrough spaced from said end, a first bent portion joined to the end of the flat top portion, said first bent portion extending outwardly away from said flat top portion and said lug, whereby the first bent portion and said lug form an acute angle between them within the range of 2° to 10° extending toward said side portion, a second bent portion joined to said first bent portion and extending toward said lug to form an angle between said first and second bent portions within a range extending substantially between 120° and 135°, a slot extending from the outermost end of said second bent portion and having a terminating end at a point intermediate the ends of said first bent portion, a bolt extending through said perforation and said slot adjacent said terminating end, a head a one end of said bolt engaging the bottom of said lug. a lock washer on said bolt interposed between said lug and said head, a nut on said bolt spaced from said head engaging the top of said first bent portion and imposing flexure therein, said nut being slidable along the top of said second bent portion during positioning into engagement with the top of said first bent portion.

References Cited in the file of this patent
UNITED STATES PATENTS

| | | |
|---|---|---|
| 617,358 | Rieg | Jan. 10, 1899 |
| 649,916 | Dietrich | May 23, 1900 |
| 1,915,924 | Coe | June 27, 1933 |
| 2,446,315 | Williams | Aug. 3, 1948 |
| 2,616,645 | Kindorf et al. | Nov. 4, 1952 |
| 3,107,076 | Rosselet | Oct. 15, 1963 |